United States Patent
Abe et al.

(10) Patent No.: US 10,475,230 B2
(45) Date of Patent: Nov. 12, 2019

(54) SURFACE MATERIAL PATTERN FINISH SIMULATION DEVICE AND SURFACE MATERIAL PATTERN FINISH SIMULATION METHOD

(71) Applicant: TOPPAN PRINTING CO., LTD., Taito-ku (JP)

(72) Inventors: Noriyuki Abe, Taito-ku (JP); Koichi Takase, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 15/847,054

(22) Filed: Dec. 19, 2017

(65) Prior Publication Data

US 2018/0108168 A1 Apr. 19, 2018

Related U.S. Application Data

(63) Continuation of application No. PCT/JP2016/066191, filed on Jun. 1, 2016.

(30) Foreign Application Priority Data

Jun. 19, 2015 (JP) ................................. 2015-123931

(51) Int. Cl.
*G06T 15/04* (2011.01)
*G06T 15/06* (2011.01)
(Continued)

(52) U.S. Cl.
CPC .............. *G06T 15/04* (2013.01); *G06T 15/00* (2013.01); *G06T 15/06* (2013.01); *G06T 15/506* (2013.01)

(58) Field of Classification Search
None
See application file for complete search history.

(56) References Cited

U.S. PATENT DOCUMENTS 6,142,628 A 11/2000 Saigo
2005/0237334 A1 10/2005 Chuter
(Continued)

FOREIGN PATENT DOCUMENTS

JP 2001-125944 A 5/2001
JP 2005-242506 A 9/2005
(Continued)

OTHER PUBLICATIONS

International Search Report dated Aug. 2, 2016 in PCT/JP2016/066191, filed Jun. 1, 2016.
(Continued)

*Primary Examiner* — Michelle Chin
(74) *Attorney, Agent, or Firm* — Oblon, McClelland, Maier & Neustadt, L.L.P.

(57) ABSTRACT

A device for generating a simulation image including circuitry which obtains information including normal vector map and light source information about a source of light to be applied to a surface of a material, calculates incident light information about incident light to each of pixels in an image to be generated as simulation of a finish of a pattern including a picture and an uneven shape on the surface, calculates a radiance of reflected light from the surface with respect to each of the pixels in the image, based on calculation information including the incident light information, the normal vector map, diffuse reflectance information about the picture, gloss information indicating gloss of the surface, and observation condition information about the material, and controls display of the image based on the radiance of each of the pixels.

14 Claims, 12 Drawing Sheets

(51) Int. Cl.
*G06T 15/00* (2011.01)
*G06T 15/50* (2011.01)

(56) References Cited

U.S. PATENT DOCUMENTS

| 2008/0024512 | A1 | 1/2008 | Chuter |
| 2010/0053161 | A1 | 3/2010 | Chuter |
| 2010/0106283 | A1 | 4/2010 | Harvill et al. |
| 2011/0254843 | A1 | 10/2011 | Chuter |
| 2017/0370040 | A1 | 12/2017 | Harvill et al. |

FOREIGN PATENT DOCUMENTS

| JP | 2007-500901 A | 1/2007 |
| JP | 2007-140820 A | 6/2007 |
| JP | 2011-103097 A | 5/2011 |
| JP | 2013-110615 A | 6/2013 |
| JP | 5434499 B2 | 3/2014 |
| WO | WO 99/40526 A1 | 8/1999 |

OTHER PUBLICATIONS

Extended European Search Report dated May 22, 2018 in European Patent Application No. 16811426.2, 10 pages.
Spence, A., et al., "Real-time per-pixel rendering of textiles for virtual textile catalogues", International Journal of Clothing Science and Technology, XP055470488, vol. 16 No. ½, Feb. 2004, 8 pages with cover page.
"Computer Graphics" CG-ARTS, vol. 2, Mar. 1, 2010, pp. 146-149, 151-152, (with partial translation).
"Introduction to 3D CG" Yuji Ogasawara, Morikita Publishing Co., LTD., vol. 2, Apr. 15, 2005, pp. 74-79, (with partial translation).
"Arnold Render Verification No. 5", Colossus Studios, http://cls-studio.co.jp, Jun. 19, 2018 (output date), 11 Pages, (with partial translation).
"Three.js Bump Mapping", Kohei (id:gupuru), http://gupuru.hatenablog.jp/entry/2013/12/10/210928, Jun. 19, 2018 (output date), 6 Pages (with partial translation).
"The 24th Bump Mapping" Wakayama University Tokoi Labo, http://marina.sys.wakayama-u.ac.jp/~tokoi/?date=20050826. Aug. 15, 2007, 9 Pages(with partial translation).

FIG.2A

| LIGHT SOURCE IDENTIFICATION INFORMATION | LIGHT SOURCE CHARACTERISTIC DATA INDEX |
|---|---|
| ****** | ****** |
| ****** | ****** |

FIG.2B

| PICTURE IDENTIFICATION INFORMATION | PICTURE IMAGE DATA INDEX |
|---|---|
| ****** | ****** |
| ****** | ****** |

FIG.2C

| GLOSS IDENTIFICATION INFORMATION | GLOSS IMAGE DATA INDEX |
|---|---|
| * * * * * * | * * * * * * |
| * * * * * * | * * * * * * |

| UNEVEN IDENTIFICATION INFORMATION | UNEVEN SHAPE DATA INDEX |
|---|---|
| * * * * * * | * * * * * |
| * * * * * * | * * * * * |

| RESULT IDENTIFICATION INFORMATION | LIGHT SOURCE CHARACTERISTIC DATA | LIGHT SOURCE POSITION DATA | OBSERVATION POSITION DATA | FACE MATERIAL POSITION DATA | FACE MATERIAL SCALING FACTOR DATA | PICTURE IMAGE DATA INDEX | GLOSS IMAGE DATA INDEX | UNEVEN SHAPE DATA INDEX | NORMAL VECTOR MAP DATA INDEX | RESULT INDEX |
|---|---|---|---|---|---|---|---|---|---|---|
| **** | **** | *** | *** | *** | *** | ***** | *** | *** | *** | *** |
| **** | **** | *** | *** | *** | *** | ***** | *** | *** | *** | *** |
| ...... | ...... | ...... | ...... | ...... | ...... | ...... | ...... | ...... | ...... | ...... |

SURFACE MATERIAL PATTERN FINISH SIMULATION DEVICE AND SURFACE MATERIAL PATTERN FINISH SIMULATION METHOD

CROSS-REFERENCE TO RELATED APPLICATIONS

The present application is a continuation of International Application No. PCT/JP2016/066191, filed Jun. 1, 2016, which is based upon and claims the benefits of priority to Japanese Application No 2015-123931, filed Jun. 19, 2015. The entire contents of these applications are incorporated herein by reference.

BACKGROUND OF THE INVENTION

Field of the Invention

The present invention relates to a surface material pattern finish simulation device and a surface material pattern finish simulation method by which to simulate a finish of a pattern on a surface material with an uneven shape on its surface, such as an embossed surface material or fabric.

Discussion of the Background

As disclosed in PTL 1, conventionally, surface materials such as wall paper and artificial leather with uneven patterns on the surfaces, car interior materials, decorative sheets for floors and furniture, and decorative materials for surfaces of industrial products have patterns formed from pictures in white, single colors, or multiple colors and uneven shapes. Pictures are printed and an uneven shape is formed on the surface of a surface material to create a pattern on the surface of the surface material. In the case of forming a pattern on a fabric, the fabric is weaved with dyed yarn in a plain weave or twill weave fashion, and the weaved fabric is dyed or pictures are printed on the weaved fabric to form the pattern (uneven shape). To check the pattern, it is necessary to produce a sample in the process of printing pictures on the surface of the surface material or forming the uneven shape on the surface of the surface material.

The use of embossing as a processing method to form an uneven shape on the surface of a surface material would involve significant costs and time to create an embossed sample and print pictures, which causes unfavorable increase in the price of the surface material.

As a solution to this problem, there is known a device for simulating a finish of a pattern on an embossed surface material without actually creating a sample (for example, refer to PTL 1).

PTL 1: JP 5434499 B

SUMMARY OF THE INVENTION

According to an aspect of the present invention, a device for generating a simulation image includes circuitry which obtains information including a normal vector map and light source information about a source of light to be applied to a surface of a material, calculates incident light information about incident light to each of pixels in an image to be generated as simulation of a finish of a pattern including a picture and an uneven shape on the surface, calculates a radiance of reflected light from the surface with respect to each of the pixels in the image, based on calculation information including the incident light information, the normal vector map, diffuse reflectance information about the picture, gloss information indicating gloss of the surface, and observation condition information about the material, and controls display of the image based on the radiance of each of the pixels.

According to another aspect of the present invention, a method of generating an image simulating a finish of a pattern including a picture and an uneven shape on a surface of a material includes calculating incident light information as information about incident light on each of pixels in the image of the finish of the pattern, based on information including a normal vector map and light source information about a source of light to be applied to the surface, calculating a radiance of reflected light from the surface for each of the pixels in the image of the finish of the pattern, based on calculation information including the incident light information, the normal vector map, diffuse reflectance information in the picture, gloss information indicating the gloss of the surface of the material, and observation condition information about the material, and displaying the image of the finish of the pattern on the surface of the material obtained from the radiance of each of the pixels.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a diagram of a configuration example of a calculation information table written and stored in advance in a surface material database 20;

FIG. 2B is a diagram of a configuration example of a calculation information table written and stored in advance in the surface material database 20;

FIG. 2C is a diagram of a configuration example of a calculation information table written and stored in advance in the surface material database 20;

FIG. 2D is a diagram of a configuration example of a calculation information table written and stored in advance in the surface material database 20;

FIG. 3 is a diagram of a configuration example of a result data table stored in a storage unit 19 corresponding to simulation results;

DESCRIPTION OF THE EMBODIMENTS

Figure 1:
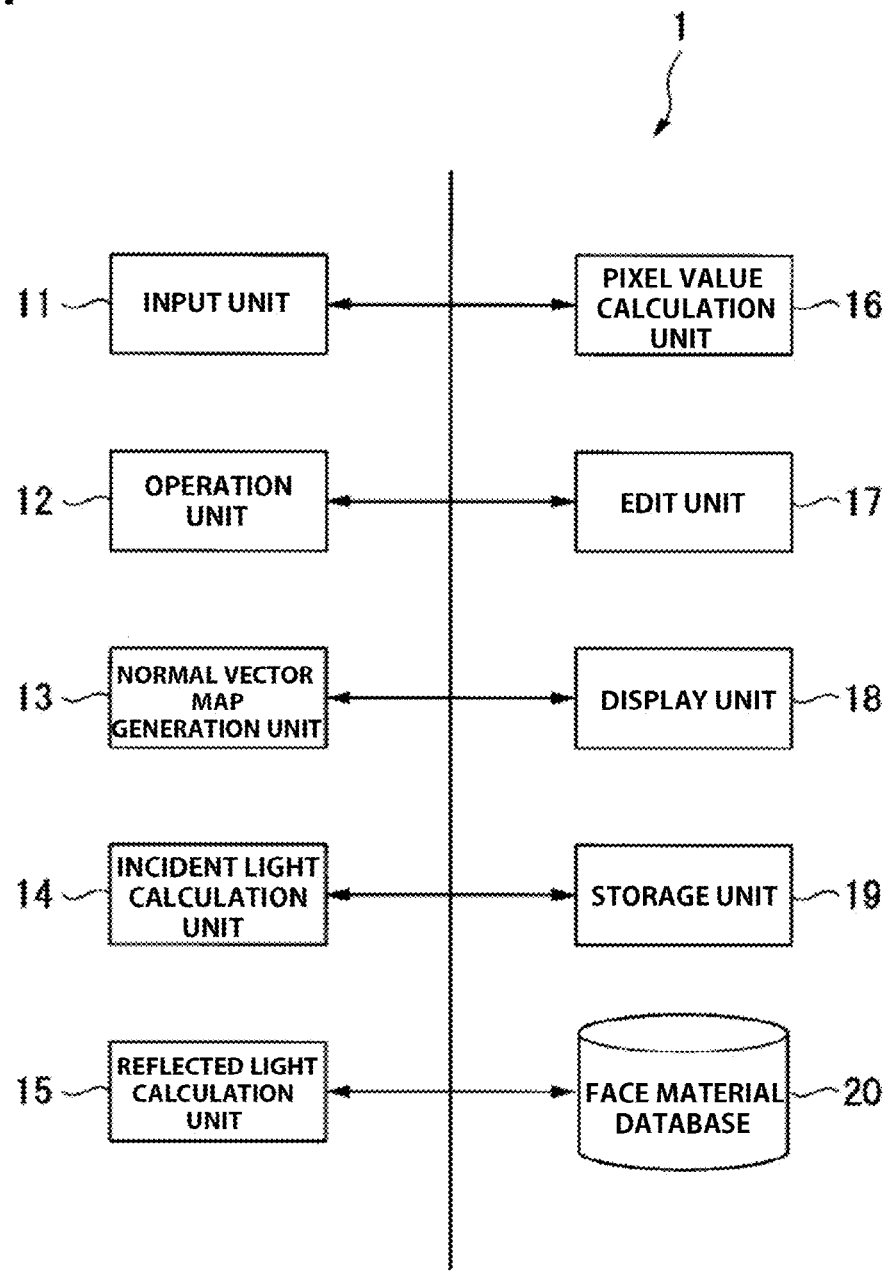
FIG. 1 is a block diagram of a configuration example of a surface material pattern finish simulation device according to an embodiment of the present invention.

The embodiments will now be described with reference to the accompanying drawings, wherein like reference numerals designate corresponding or identical elements throughout the various drawings.

An embodiment of the present invention will be described below with reference to the drawings.

FIG. 1 is a block diagram of a configuration example of a surface material pattern finish simulation device according to the embodiment of the present invention. Referring to FIG. 1, a surface material pattern finish simulation device 1 includes an input unit 11, an operation unit 12, a normal vector map generation unit 13, an incident light calculation unit 14, a reflected light calculation unit 15, a pixel value calculation unit 16, an edit unit 17, a display unit 18, a storage unit 19, and a surface material database 20.

Information supplied from input devices (input means) such as a keyboard, a mouse, and a touch pad, for example, is input into the input unit 11. Input into the input unit 11 are calculation information such as light source characteristic data, light source position data, observation position data, surface material position data, surface material scaling factor data, picture image data, gloss image data, and uneven shape data, and changes to the calculation information.

The light source characteristic data is information indicating characteristics of light emitted from a light source to the surface of a surface material to be calculated at the time of simulation. The light source position data is information indicating the position of the light source in three-dimensional spatial coordinates with respect to the surface of the surface material to be calculated. The observation position data is observation information on a position in a three-dimensional space where the surface of the surface material is observed.

The surface material position data is information indicating the position of the surface of the surface material in a three-dimensional space for simulation, for example, information indicating coordinates (position) of a central point in the surface material in the three-dimensional space. The surface material scaling factor data is information indicating a scaling factor of the surface of the surface material in the three-dimensional space for simulation (a scaling factor with which to adjust the display image resolution and display size of the surface of the surface material). The picture image data is diffuse reflectance information in the region of pictures drawn on the surface of the surface material. The gloss image data is information about the gloss on the surface of the surface material. The picture image data and the gloss image data are given to each of pixels forming the image of the surface of the surface material. The uneven shape data indicates an uneven shape of an embossed film (uneven shape) formed from a transparent resin on the surface of the surface material.

The surface material pattern finish simulation device in the embodiment is described with a surface material having an embossed film with an uneven shape on the surface of the surface material as an example. However the surface material pattern finish simulation device in the embodiment is also usable for simulation of a finish of a pattern on the surface of a surface material having no embossed film with an uneven shape but having an uneven shape on the surface of the surface material itself.

FIGS. 2A to 2D are diagrams illustrating configuration examples of a calculation information table written and stored in advance in the surface material database 20. FIG. 2A illustrates a light source information table that provides information about light sources for use in simulation. Written and stored in advance in the table are light source identification information for identifying the light sources and light source characteristic data indexes as indexes such as addresses in the surface material database 20 storing characteristics of wavelengths of the light sources indicated by the light source information.

FIG. 2B is a picture information table that provides diffuse reflectance information in the region of pictures to be applied to the surface of the surface material for use in simulation. Written and stored in advance in the picture information table are picture identification information for identifying pictures and picture image data indexes as indexes such as addresses in the surface material database 20 storing the diffuse reflectance information in each of the pixels in the region of the picture indicated by the picture identification information.

FIG. 2C illustrates a gloss information table that provides information about the surface of the surface material for use in simulation. Written and stored in advance in the gloss information table are gloss identification information for identifying gloss and gloss image data indexes as indexes such as addresses in the surface material database 20 storing gloss image data in each of the pixels on the surface of the surface material indicated by the gloss identification information. The gloss image data is set for each of the pixels on the surface of the surface material as described above, which indicates the specular reflectance and surface roughness representing the gloss in each of the pixels.

FIG. 2D is an uneven shape table that indicates uneven shapes on an embossed film formed on the surface of the surface material for use in simulation. Written and stored in advance in the uneven shape table are uneven shape identification information for identifying the uneven shapes and uneven shape data indexes as indexes such as addresses in the surface material database 20 storing uneven shape data indicative of an embossed print including uneven shape information such as the cycle of the uneven shape, the width of projections and the width of depressions in the uneven shape, the shape of top of the projections, the shape of bottom of the depressions the distance between the top of the projections and the bottom of the depressions indicated by the uneven shape identification information.

Returning to FIG. 1, in the embodiment, the surface material database 20 is provided in the surface material pattern finish simulation device 1. Alternatively, the surface material database 20 may be provided on a network not illustrated. In this case, the surface material pattern finish simulation device 1 may be configured to refer to the light source information table, the picture information table, the gloss information table, and the uneven shape table via the network. The surface material database 20 is formed from a media reading device such as an optical drive, a hard disc, or the like.

FIG. 3 is a diagram illustrating a configuration example of a result data table stored in the storage unit 19 corresponding to simulation results. Referring to FIG. 3, the light source characteristic data indexes, the light source position data, the observation position data, the surface material position data, the surface material scaling factor data, the picture image data indexes, the gloss image data indexes, the uneven shape data indexes, the normal vector map data indexes, and the result indexes are written and stored in the storage unit 19. The light source characteristic data indexes, the picture image data indexes, the gloss image data indexes, and the uneven shape data indexes are data read respectively from the light source information table, the picture information table, the gloss information table, the uneven shape table illustrated in FIGS. 2A to 2D in response to user selection through the input unit 11.

For the light source position data, the observation position data, the surface material position data, and the surface material scaling factor data, the data input by the user through the input unit 11 are written into the storage unit 19 through the input unit 11. The normal vector map data indexes are indexes such as addresses in the storage unit 19 storing the normal vector map data indicating normal vector data at each of the pixels on the uneven surface of the embossed film presided on the surface of the surface material. The normal vector map data indexes are written and stored in advance in the storage unit 19. The result indexes are indexes such as addresses in the storage unit 19 storing result images indicating a pattern on the surface of the surface material at an observation position obtained by simulation with the use of the light source characteristic data, the light source position data, the observation position data, the surface material position data, the surface material scaling factor data, the picture image data, the gloss image data, the uneven shape data, and the normal vector map data. The result indexes are written and stored in advance in the storage unit 19.

Returning to FIG. 1, at the time of simulation of a pattern on the surface of the surface material, the input unit 11 provides result identification information and writes and stores the light source position data, the observation position data, the surface material position data, and the surface material scaling factor data input by the user in the result data table in the storage unit 19. The input unit 11 also reads the light source characteristic data index from the light source information table in the surface material database 20 corresponding to the light source characteristic data selected by the user from a selection screen on the display unit 18, and writes and stores the same in the result data table in the storage unit 19 corresponding to the result identification information. In addition, the input unit 11 reads the picture image data index, the gloss image data index, and the uneven shape data index respectively from the picture information table, the glass information table, and the uneven shape table in the surface material database 20 corresponding to the picture image data, the gloss image data, and the uneven shape data selected by the user from the selection screen on the display unit 18, and writes and stores the same in the result data table in the storage unit 19 corresponding to the result identification information.

With input of information on a change to any one, a combination of some, or all of the light source characteristic data, the light source position data, the observation position data, the surface material position data, the surface material scaling factor data, the picture image data, the gloss image data, and the uneven shape data supplied from the input unit 11, the operation unit 12 provides new result identification information, and writes and stores the same into the result data table in the storage unit 19. The processes for changing the foregoing data will be described later.

The normal vector map generation unit 13 reads the uneven shape data index from the result data table in the storage unit 19, and reads the uneven shape data from the surface material database 20 by the uneven shape data index. The normal vector map generation unit 13 develops the uneven shape data as an embossed film on the surface of the surface material, and determines a normal vector of the surface of the uneven shape at each of the pixels on the surface of the screen. The uneven shape data may be a normal vector map formed from the normal vector set to each of the pixels on the surface of the surface material. The uneven shape data may be any of a depth image having depth information indicating the depth of bottom portions in the uneven shape, a height image having height information indicating the height of top portions in the uneven shape, point cloud data indicating coordinates of each of the pixels in the uneven shape in a three-dimensional space, and a polygon mesh.

When the uneven shape data is the depth image and the height image, the general method for determining a normal vector from the height image described in PTL 1 is used to determine a normal vector of each of the pixels on the surface of the uneven shape. To determine a normal vector from the point cloud or the polygon mesh, for example, a point cloud library (PCL) as a point cloud processing library is used as a general method (means).

In this case, the normal vector map generation unit 13 projects the normal vector determined for each of the pixels in the three-dimensional space forming the surface of the uneven shape onto each of the pixels on the surface of the surface material as a two-dimensional plane to determine a normal vector map indicating the normal vector of each of the pixels on the surface of the surface material. Then, the normal vector map generation unit 13 writes and stores the determined normal vector map in the storage unit 19, and writes and stores the writing address as a normal vector map data index into the result data table in the storage unit 19.

The incident light calculation unit 14 calculates irradiance $E_i$ of light incident on each of the pixels (target point) on the surface of the surface material from emission light $I_i$ by the light source characteristic data, the light source position data, the surface material position data, the surface material scaling factor data, and the normal vector map, using Equation (1) as follows:

Math. 1

$$E = \frac{I_i}{d^2} \times \cos\theta \quad (1)$$

Figure 4:
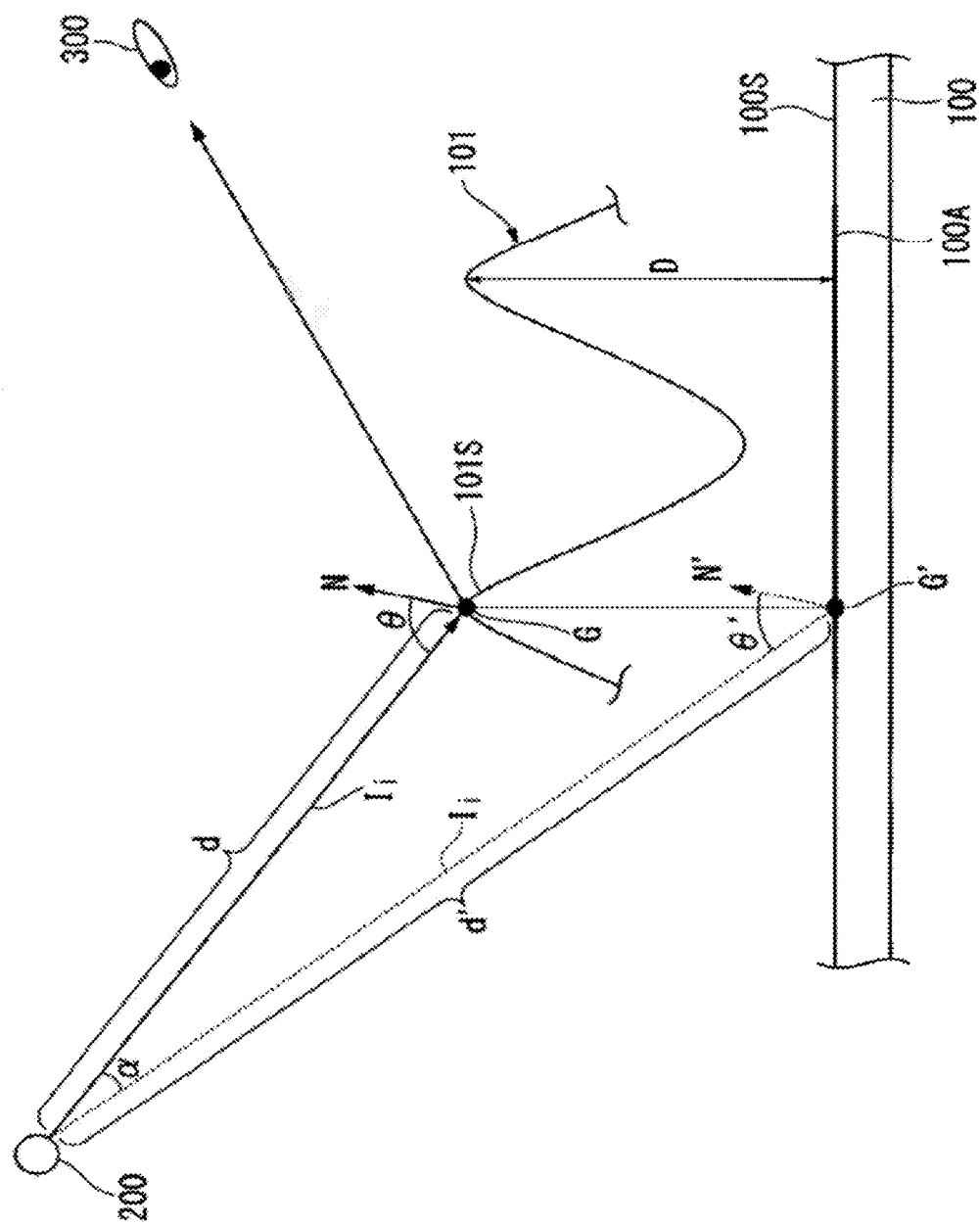
FIG. 4 is a diagram describing correspondences between outgoing light $I_1$ emitted from a light source and irradiance E of light into each of pixels on the surface of an embossed film.

FIG. 4 is a diagram describing correspondences between the outgoing light $I_i$ emitted from a light source and the irradiance E of light input into each of pixels on the surface of an embossed film. A picture data region with picture data resides on a surface 100S of a surface material 100 corresponding to a picture. An embossed film 101 formed from a transparent resin or the like is provided on the surface 100S of the surface material 100. The normal vector map is formed by calculating a normal vector N of each of the pixels constituting an uneven surface 101S of the embossed film 101. The normal vector N is projected onto the pixel on the surface 100S of the surface material 100 and becomes a normal vector N'.

In Equation (1). θ represents the angle formed by the normal sector N and the incident light $I_i$ from a light source 200 to a pixel G, and d represents the distance between the light source 200 and the pixel G.

In the embodiment, the irradiance E is calculated using the normal vector map. Accordingly, the incident light $I_i$ actually used in Equation (2) becomes incident light $I_i'$ on a pixel G' on the surface 100S of the surface material 100. In addition, the angle θ becomes an angle θ' formed by a normal vector N' of the pixel G' on the surface 100S of the surface material 100 and the incident light $I_i'$ on the pixel G'. However, thickness D of the embossed film is very small as compared to the distance d and distance d'(D<<d or d'). Accordingly, an angle α formed by the incident light $I_i$ and the incident light $I_i'$ is close to 0, and the error between the angle θ and the angle θ' be almost ignored. In the foregoing description, the calculation of the irradiance E for one pixel is taken. However, the incident light calculation unit 14 calculates the irradiance E for the other pixels.

In FIG. 4, reference sign 300 represents an observation position where a pattern on the surface 100S of the surface material 100 is observed.

Returning to FIG. 1, the reflected light calculation unit 15 calculates radiance $I_2$ of the reflected light from each of the pixels on the surface 100S of the surface material 100 with respect to the observation position 300, using the irradiance E input into each of the pixels calculated by the incident light calculation unit 14, and the light source characteristic data, the light source position data, the observation position data, the surface material position data, the surface material scaling factor data, the picture image data, the gloss image data, and the normal vector map from the result data table in the storage unit 19. In this case, the reflected light calculation unit 15 uses a model formula of a bidirectional reflectance distribution function (BRDF) to calculate radiance $I_2$ of the reflected light. As a model formula of BRDF, there is a Cook-Torrance model described in a reference literature (A Reflectance Model for Computer Pictures, Robert L. Cook, and Kenneth E. Torrance, ACM SIGGRAPH Computer Pictures 1981, Vol. 15 No. 3).

The pixel value calculation unit 16 calculates a pixel value d of each of the pixels from the radiance $I_2$ of the reflected light from each of the pixels calculated by the reflected light calculation unit 15, using Equation (2) as follows:

Math. 2

$$d = f(\alpha I_0) \quad (2)$$

In Equation (2), $f(\alpha I_0)$ represents a function for determining the pixel value d from the radiance $I_0$, and α represents a scaling coefficient for correcting the characteristics of a display device constituting the display screen of the display unit 18 and displaying the finish of a pattern properly with the calculated pixel values. If the radiance is not multiplied by the scaling coefficient, the pixel values on the display unit 18 vary depending on the characteristics of the individual display device.

For the sake of simplification, the pixel value calculation unit 16 has been described in relation to one pixel. However, the reflected light calculation unit 15 determines the radiance $I_2$ and the pixel value d of all of the pixels constituting the surface 100S of the surface material 100 from the light source position data, the observation position data, the surface material position data, and the surface material scaling factor data. That is, the reflected light calculation unit 15 extracts the pixels in the uneven shape where the outgoing light $I_i$ enters, except for the pixels not irradiated with the outgoing light $I_i$ due to the blocking of other uneven shapes. Then the reflected light calculation unit 15 calculates the radiance $I_2$ of all of the pixels where the outgoing light $I_i$ enters. In addition, the pixel value calculation unit 16 calculates the pixel values d of the pixels from the radiances $I_2$ of the pixels calculated by the reflected light calculation unit 15 using Equation (2).

In the foregoing description, the radiance $I_2$ is calculated for a single wavelength.

With a plurality of wavelengths, the reflected light calculation unit 15 calculates the radiance $I_2$ by Equation (3) as follows:

Math. 3

$$I_0 = \int I_\lambda d\lambda \quad (3)$$

In Equation (3), $I_\lambda$ represents the radiance with wavelength λ. Therefore, the radiance $I_2$ determined by Equation (3) have a value obtained by integrating the radiance $I_\lambda$ determined for each of the wavelengths.

To provide the result image of a pattern on the surface of the surface material as red, green, and blue (RGB) images, the reflected light calculation unit 15 performs a process described below. That is, the reflected light calculation unit 15 calculates the radiance $I_2$ of the reflected light in each of RGB channels using the picture image data, the gloss image data indicating information about the specular reflectance and surface roughness in each of the RGB channels, and the radiance of the outgoing light $I_i$ in each of RGB channels. The reflected light calculation unit 15 may use spectroscopy data of the outgoing light $I_i$ emitted from the light source as the radiance of the outgoing light $I_i$ in each of the RGB channels.

The edit unit 17 sets the pixel values d of the pixels calculated by the pixel value calculation unit 16 as image data of the result image, and writes and stores the same into the storage unit 19. The edit unit 17 writes and stores the address at which the image data of the result image is written as a result index corresponding to the result identification information in the result data table in the storage unit 19.

The display unit 18 reads the result index from the result data table in the storage unit 19. Then, the display unit 18 reads the image data of the result image from the storage unit 19 by the result index, and displays the image data of the result image as an image on the display surface.

Written and stored in advance in the surface material database 20 are the light source information table, the picture information table, the gloss information table, and the uneven shape table described above with reference to FIGS. 2A to 2D.

Figure 5:
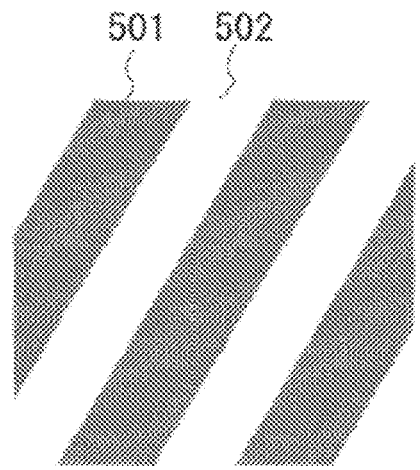
FIG. 5 is a diagram of an example of picture image data stored corresponding to picture image indexes in a picture information table in the storage unit 19.

FIG. 5 is a diagram illustrating an example of the picture image data stored corresponding to the picture image index in the picture information table in the storage unit 19. Referring to FIG. 5, the pixels in a region 501 have diffuse reflectances different from those of the pixels in a region 502.

Figure 6:
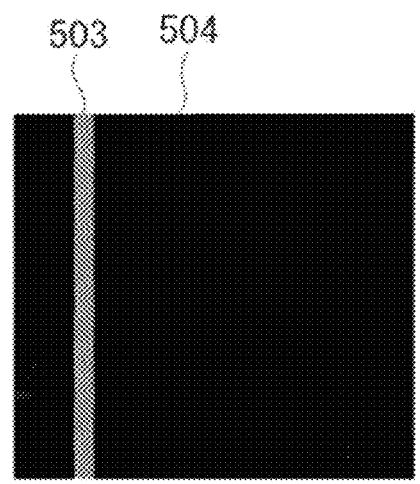
FIG. 6 is a diagram of an example of optical gloss image data stored corresponding to gloss image indexes in a gloss information table in the storage unit 19.

FIG. 6 is a diagram of an example of the optical gloss image data stored in the gloss information table in the storage unit corresponding to the gloss image index. Referring to FIG. 6, the pixels in the region 503 have specular reflectances and surface roughnesses different from those of the pixels in a region 504. To generate RGB images, the gloss image data is provided for each of RGB.

Figure 7:
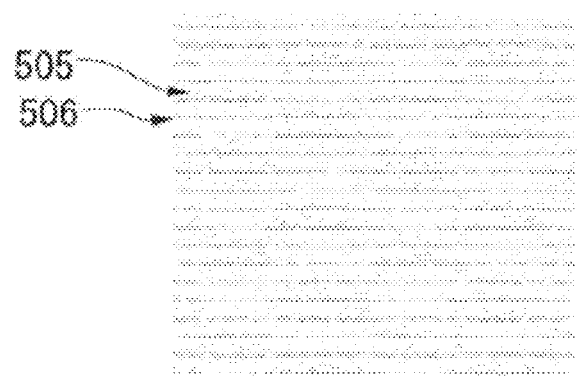
FIG. 7 is a diagram of an example of uneven shape data stored corresponding to uneven shape data indexes in an uneven shape table in the storage unit 19.

FIG. 7 is a diagram of an example of the uneven shape data stored in the uneven shape table in the storage unit 19 corresponding to the uneven shape data index. Referring to FIG. 7, for example, convex portions 505 and concave portions 506 are aligned in a predetermined cycle. As described above, each of the pixels has depth information, height information, or coordinate values in a three-dimensional space.

Figure 8:
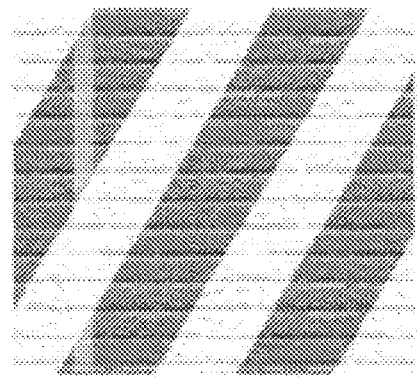
FIG. 8 illustrates image data of a result image of the finish of the pattern determined from the picture image data illustrated in FIG. 5, the gloss image data illustrated in FIG. 6, and the uneven shape data illustrated in FIG. 7.

FIG. 8 illustrates image data of a result image of the finish of the pattern determined from the picture image data illustrated in FIG. 5, the gloss image data illustrated in FIG. 6, and the uneven shape data illustrated in FIG. 7. It can be seen that the image reflects the information in the picture image data, the gloss image data, and the uneven shape data.

Figure 9:
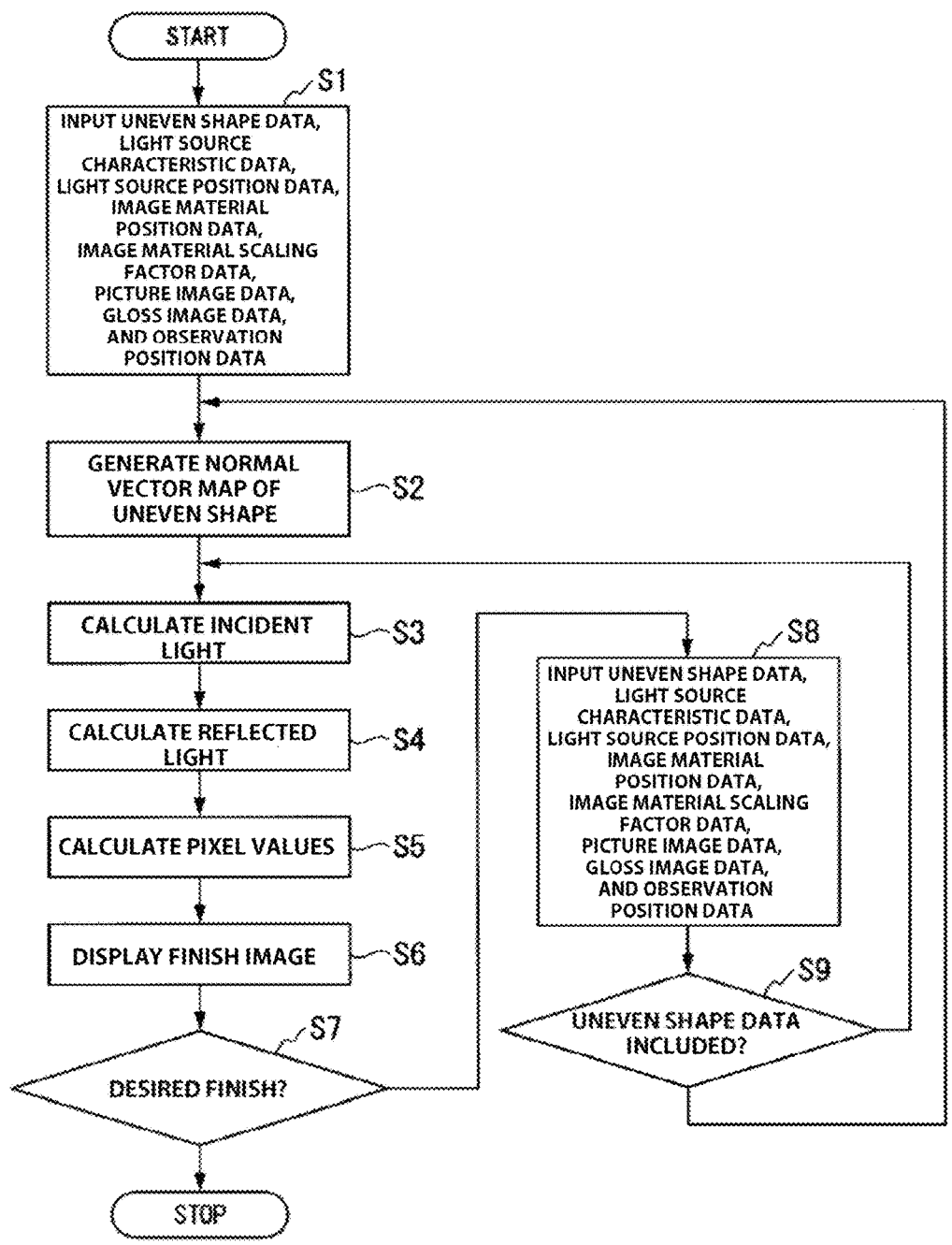
FIG. 9 is a flowchart of an example of a process for generating image data of a result image by the surface material pattern finish simulation device according to the embodiment of the present invention.

FIG. 9 is a flowchart of an example of a process for generating image data of a result image by the surface material pattern finish simulation device according to the embodiment.

Step S1:

The user selects by the input unit 11 the types of the light source characteristic data, the picture image data, the gloss image data, and the uneven shape data displayed on the display unit 18, for example.

In addition, the user inputs the observation position data, the light source position data, the surface material position data, and the surface material sealing factor data into the input fields displayed on the display unit for example.

According to the foregoing user operation, the input unit 11 reads the respective light source characteristic data, picture image data index, gloss image data index, and uneven shape data index in the input light source characteristic data, picture image data, gloss image data, and uneven shape data, from the light source information table, the picture information table, the gloss information table, and the uneven shape table in the surface material database 20. Then, the input unit 11 writes and stores the read light source characteristic data, picture image data index, gloss image data index, and uneven shape data index in the observation result table in the storage unit 19. The input unit 11 also writes and stores the input observation position data, light source position data, surface material position data, and surface material scaling factor data in the input fields of the display unit 18, in the observation result table in the storage unit 19.

Step S2:

The normal vector map generation unit 13 reads the uneven shape data index from the result data table in the storage unit 19, and reads the uneven shape data from the surface material database 20 using the uneven shape data index.

Then, the normal vector map generation unit 13 develops the uneven shape data as an embossed film onto the surface of the surface material and determines a normal vector on the surface of the uneven shape for each of the pixels on the surface of the screen. The normal vector map generation unit 13 writes and stores the normal vector of each of the pixels, that is, the normal vector map corresponding to the normal vector of each of coordinates of the pixels in the storage unit 19. The normal vector map generation unit 13 also writes and stores the address at which the normal vector map is written into the storage unit 19, as the normal vector map data index, in the result data table in the storage unit 19.

Step S3:

The incident light calculation unit 14 reads the normal vector map data index from the result data table in the storage unit 19. Then, the incident light calculation unit 14 reads the normal vector map from the storage unit 19 using the normal vector map data index. The incident light calculation unit 14 also reads the light source characteristic data, the light source position data, the surface material position data, and the surface material scaling factor data from the result data table in the storage unit 19. The incident light calculation unit 14 also reads Equation (1) from the storage unit 19.

The incident light calculation unit 14 calculates using Equation (1) the irradiance E of the incident light on each of the pixels (target point) on the surface of the surface material from the outgoing light $I_i$, from the light source characteristic data, the light source position data, the surface material position data, the surface material scaling factor data, and the normal vector map. Then, the incident light calculation unit 14 writes and stores the irradiance E of the incident light determined for each of the pixels in the storage unit 19.

Step S4:

The reflected light calculation unit 15 reads the normal vector map data index from the result data table in the storage unit 19. Then, the incident light calculation unit 14 reads the normal vector map from the storage unit 19 by the normal vector map data index. The reflected light calculation unit 15 also reads from the storage unit 19 the irradiance E of the light input into each of the pixels calculated by the incident light calculation unit 14. The reflected light calculation unit 15 reads from the result data table in the storage unit 19 the light source characteristic data, the light source position data, the observation position data, the surface material position data, the surface material scaling factor data, the picture image data index, and the gloss image data index. The reflected light calculation unit 15 reads the picture image data and the gloss image data from the surface material database 20 by the picture image data index and the gloss image data index.

Then, the reflected light calculation unit 15 uses the light source characteristic data, the light source position data, the observation position data, the surface material position data, the surface material scaling factor data, the picture image data, the gloss image data, and the normal vector map to calculate the radiance $I_2$ of the reflected light from each of the pixels on the surface 100S of the surface material 100 at the observation position 300 by a model formula of bidirectional reflectance distribution function.

Step S5:

The pixel value calculation unit 16 reads from the storage unit 19 Equation (2) and the radiance $I_2$ of the reflected light from each of the pixels.

Then, the pixel value calculation unit 16 calculates using Equation (2) the pixel value of each of the pixels seen from the observation position, from the radiance $I_2$ of the reflected light from each of the pixels at the observation position calculated by the reflected light calculation unit 15. The edit unit 17 sets the pixel value d of each of the pixels calculated by the pixel value calculation unit 16 as image data of a result image, and writes and stores the same in the storage unit 19. Then, the edit unit 17 writes and stores the address at which the image data of the result image is written as a result index corresponding to the result identification information in the result data table in the storage unit 19.

Step S6:

The display unit 18 reads the result index from the result data table in the storage unit 19, reads the image data of the result image from the storage unit 19 by the result index, and displays the image data of the result image as an image on the display surface.

Step S7:

The user observes the result image displayed on the display surface of the display unit 18 and determines whether the pattern is finished corresponding to the desired appearance. When the user feels that the pattern is finished corresponding to the desired appearance, the user uses the input device to control the surface material pattern finish simulation device 1 to terminate the process for designing the surface material with the uneven shape. In contrast, when the user does not feel that the pattern is finished corresponding to the desired appearance, the user inputs into an edit field in the display unite 18, any one, a combination of some, or all of the light source characteristic data, the light source position data, the observation position data, the surface material position data, the surface mates scaling factor data, the picture image data, the gloss image data, and the uneven shape data to be changed.

At that time, the operation unit 12 rewrites the changed data with addition of new result identification information and keeps the unchanged data intact in the result data table in the storage unit 19, and generates a record for determining a new result image from the changed data group.

Step S8:

The operation unit 12 determines whether the data to be changed by the user includes the uneven shape data.

When the data to be changed by the user includes the uneven shape data, the operation unit 12 executes the process to step S2. When the data to be changed by the user does not include the uneven shape data, the operation unit 12 executes the process to step S3.

As described above, in the embodiment, simulations are carried out using parameters influencing the appearance of a pattern formed from an uneven shape and a picture applied to the surface of a surface material such as the uneven shape data, the picture image data, and the gloss image data. This makes it possible to check the result with a degree of accuracy close to an actual sample, which eliminates the need to create a sample and allows the user to check the finish of the pattern on the surface material in a quick and easy manner.

Figure 10:
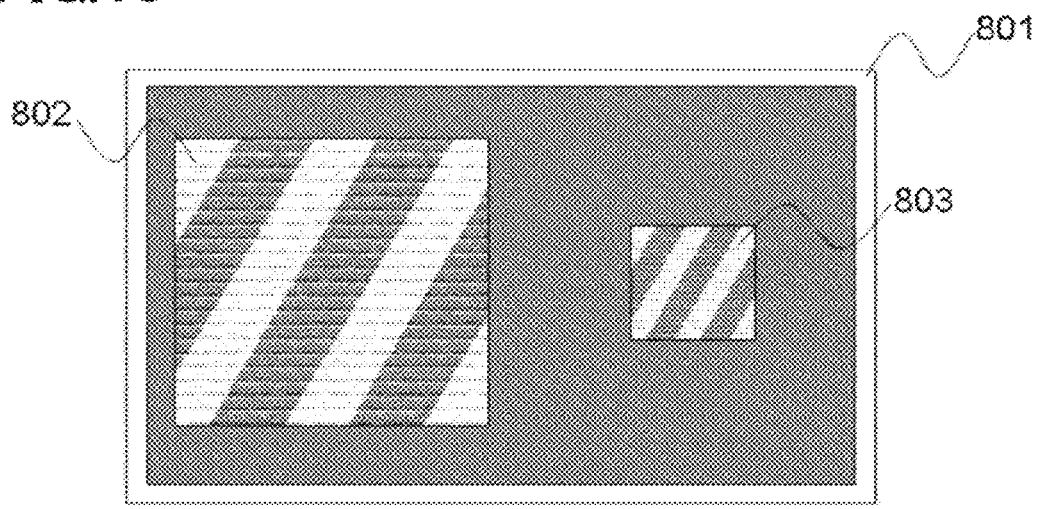
FIG. 10 is a diagram describing display of images of a pattern on a surface material that are different in surface material scaling factor data in the surface material scaling factor data.

FIG. 10 is a diagram describing display of images of a pattern on a surface material different in surface material scaling factor data in the surface material scaling factor data. The same results can be obtained by making the observation position in the observation position data distant from the surface of the surface material. Referring to FIG. 10, in a display image 801 on the display unit 18, an image 802 is a result image representing the appearance of the pattern with a surface material scaling factor of 1 as actual size, and an image 803 is a result image representing the appearance of the pattern with a surface material sealing factor of 0.5. The display unit 18 displays in parallel image data of the result images selected by the user from the result data table as illustrated in FIG. 10. Accordingly, the user can observe the finish of the pattern on the surface of the same surface material from far and neat at the same time and determine whether the uneven shape and picture on the embossed film are optimum.

When the size of the result image to be displayed is smaller than the actual size of the surface material, the display unit 18 cuts out the result image of the surface material to a necessary size and displays the same on the display surface. When the size of the result image to be displayed is larger than the actual size of the surface material, the display unit 18 duplicates (copies) the result image of the surface material, and pieces the copied images together and displays the composite image on the display surface.

Figure 11:
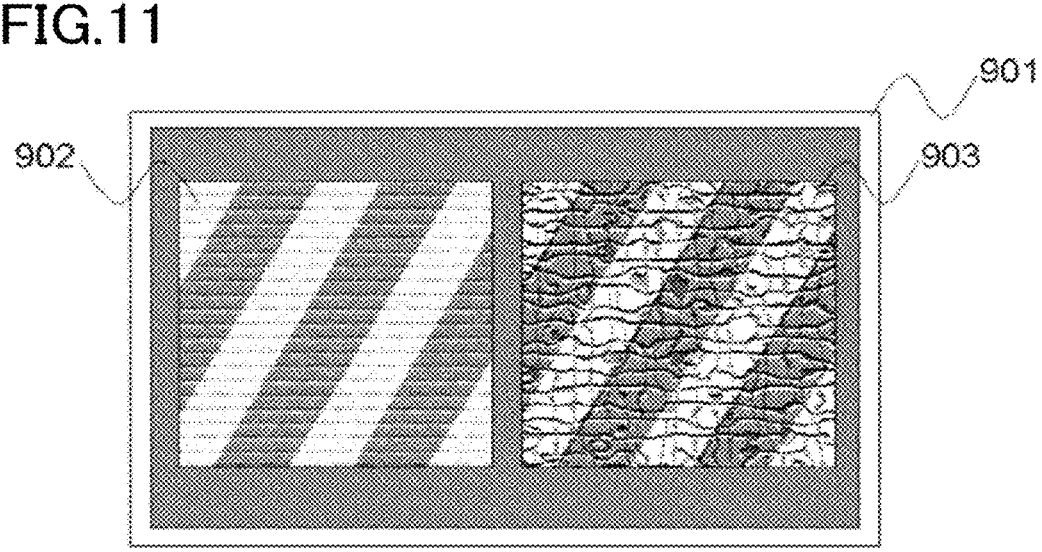
FIG. 11 is a diagram describing display of images of a pattern on a surface material that have the same gloss image data and picture image data and have different uneven shape data.

FIG. 11 is a diagram describing display of images of a pattern on a surface material that are equal in the gloss image data and the picture image data and are different in the uneven shape data. Referring to FIG. 11, an image 902 and an image 903 in a display image 901 on the display unit 18 are equal in the picture image data and the gloss image data and are different in the uneven shape data. The display unit 18 displays in parallel image data of the result images selected by the user from the result data table as illustrated in FIG. 11. Accordingly, the user can observe images having different uneven shape data at the same time for the finish of the pattern on the surface of the same surface material, and determine whether the uneven shape data of the embossed film is optimum. Displaying in parallel the result images of the finish of the pattern by a combination of a plurality of different uneven shape data with the same picture image data and gloss image data as illustrated in FIG. 11 makes it possible to select the uneven shape data close to the desired finish of the pattern with respect to the picture image data and the gloss image data. In addition, it is possible to optimize a pair of the picture image data and the gloss image data at the same time for the different uneven shape data.

Figure 12:
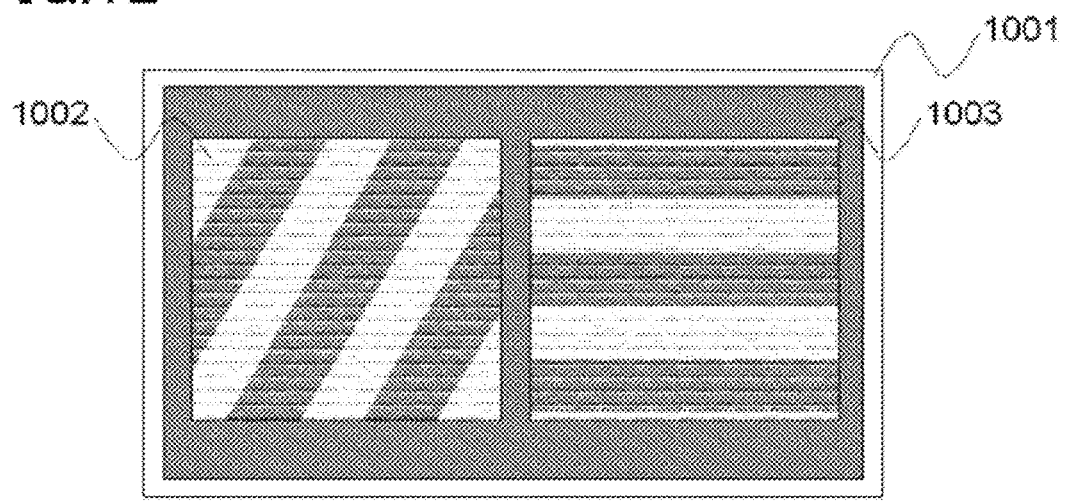
FIG. 12 is a diagram describing display of images of a pattern on a surface material that are equal to the gloss image data and the uneven shape data and are different in the picture image data.

FIG. 12 is a diagram describing display of images of a pattern on a surface material that are equal in the gloss image data and the uneven shape data and are different in the picture image data. Referring to FIG. 12, an image 1002 and an image 1003 in a display image 1001 on the display unit 18 have the same uneven shape data and gloss image data but have different picture image data. The display unit 18 displays in parallel image data of the result images selected by the user from the result data table as illustrated in FIG. 12. Accordingly, the user can observe different images in the picture image data at the same time for the finish of the pattern on the surface of the same surface material, and determine whether the picture image data applied to the surface of the surface material is optimum. Displaying in parallel the result images of the finish of the pattern by a combination of the different picture image data with the same picture image data and gloss image data as illustrated in FIG. 12 makes it possible to select the picture image data close to the desired finish of the pattern with respect to the uneven shape data and the gloss image data. In addition, it is possible to optimize a pair of the uneven shape data and the gloss image data at the same time for the different picture image data.

Figure 13:
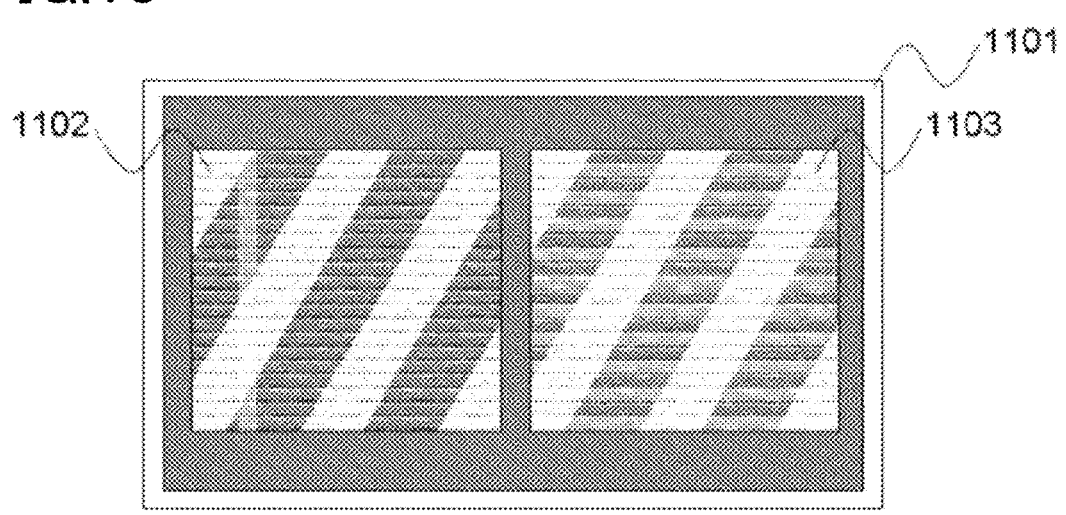
FIG. 13 is a diagram describing display of images of a pattern on a surface material that are equal in the picture image data and the uneven shape data and are different in the gloss image data.

FIG. 13 is a diagram describing display of images of a pattern on a surface material that have the same picture image data and uneven shape data but have different gloss image data. Referring to FIG. 13, an image 1102 and an image 1103 in a display image 1101 on the display unit 18 have the same uneven shape data and picture image data but different gloss image data. The display unit 18 displays in parallel image data of the result images selected by the user from the result data table as illustrated in FIG. 13. Accordingly, the user can observe images having different gloss image data at the same time for the finish of the pattern on the surface of the same surface material, and determine whether the gloss image data on the surface of the surface material is optimum. Displaying in parallel the result images of the finish of the pattern by a combination of the different gloss Image data with the same picture image data and uneven shape data as illustrated in FIG. 13 makes it possible to select the gloss image data close to the desired finish of the pattern with respect to the uneven shape data and the picture image data. In addition it is possible to optimize a pair of the picture image data and the uneven shape data for the different gloss image data.

Returning to FIG. 1, when the user provides instructions using the input device for an operation such as the change of the pixel values, the enlargement and reduction of the result image illustrated in FIG. 10 (the change of the image resolution and display size), the enlargement, reduction, rotation, or translation of the uneven shape data, the picture image data, and the gloss image data at step S8 in the flowchart of FIG. 9 described above, the operation unit 12 performs again a simulation of the finish of the pattern as described above.

At that time, such operations as tap, swipe, and pinch are performed on the display screen of the display unit 18 by a touch pad or the like as an operation device (operation means) for changing the uneven shape data, the picture image data, and the gloss image data. The operation unit 12 captures the data changed by the operation device and reflects the same in the result data table in the storage unit 19.

Figure 14:
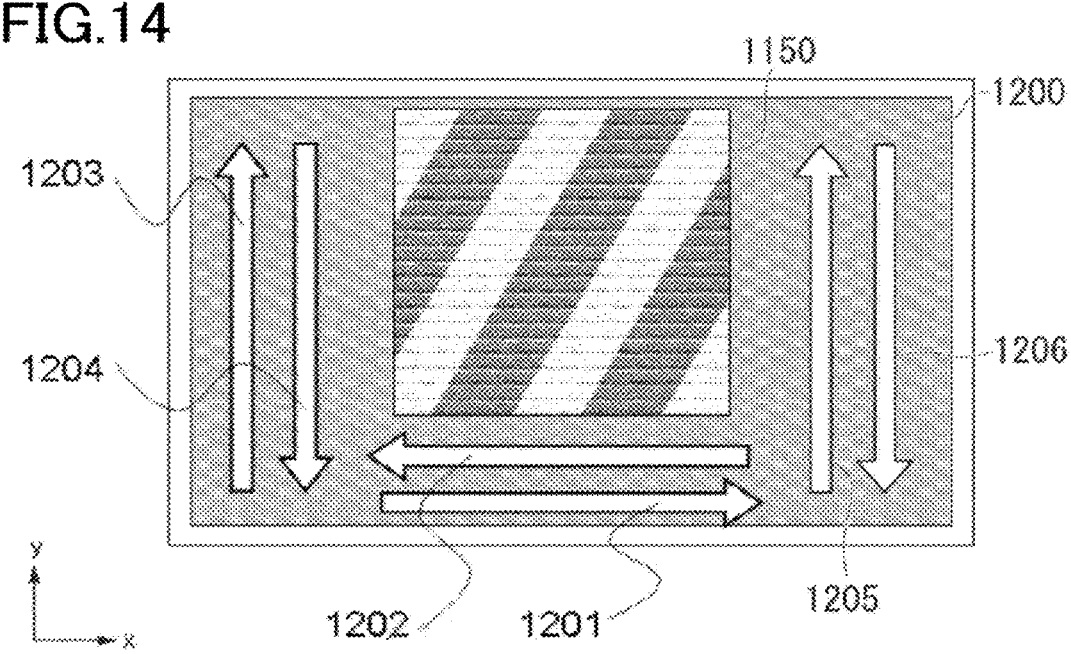
FIG. 14 is a diagram describing changing of the picture image data, the gloss image data, and the uneven-shape data by the use of a pointing device.

FIG. 14 is a diagram describing the change of the picture image data, the gloss image data, and the uneven shape data by the use of a pointing device. The pointing device may be a mouse, a touch pad, or the like. Referring to FIG. 14, for example, the user moves a mouse to the right along an arrow image 1201 (+x-axis direction in the drawing) to reduce the picture image data (or the gloss image data or the uneven shape data) in the x-axis direction. Meanwhile, the user moves the mouse to the left along an arrow image 1202 (−x-axis direction in the drawing) to enlarge the picture image data (or the gloss image data or the uneven shape data).

In addition, the user moves the mouse upward along an arrow image 1203 (+y-axis direction in the drawing) to reduce the picture image data (or the gloss image data or the uneven shape data) in the y-axis direction. Meanwhile, the user moves the mouse downward along an arrow image 1204 (−y-axis direction in the drawing) to enlarge the picture image data (or the gloss image data or the uneven shape data) in the y-axis direction. Before the process described in FIG. 14, the user selects which of the picture image data, the gloss image data, and the uneven shape data to be enlarged or reduced on the display screen of the display unit 18. The operation unit 12 performs calculations of the coordinates of the image for the enlargement and reduction of the picture image data (or the gloss image data or the uneven shape data) by Equation (3) and (4) as follows:

Math. 4

$$x_d = \frac{x - 0.5w}{m} + 0.5w \qquad (4)$$

Math. 5

$$y_d = \frac{y - 0.5h}{m} + 0.5h \qquad (5)$$

The operation unit uses Equations (4) and (5) to calculate the coordinates of the image corresponding to the four corners of the surface material from the scaling factor of the image, and performs texture mapping to enlarge or reduce the image corresponding to the scaling factor Equation (4) is used for enlargement or reduction in the x-axis direction, and Equation (5) is used for enlargement or reduction of the y-axis direction in Equations (4) and (5) m represents the scaling factor (the scaling factor of the surface material). In Equation (4), w represents the width of the image. In Equation (5), h represents the height of the image. In addition, in Equation (4), x corresponds to the x coordinate values of the four corners of the surface material before enlargement or reduction, and $x_d$ corresponds to the x coordinate values of the same after enlargement or reduction. Similarly, in Equation (5), y corresponds to the y coordinate values of the four corners of the surface material before enlargement or seduction, and $y_d$ corresponds to the y coordinate values of the same after enlargement or reduction. Changing the pitch of the image in each of the picture image data, the gloss image data, and the uneven shape data by Equations (3) and (4) allows the user to select by intuition the value of the scaling factor to be changed. To change the picture image data, the gloss image data, and the uneven shape data, the image may be partly or entirely replaced with other picture image data, gloss image data, and uneven shape data stored in the surface material database 20.

The user moves the mouse upward along an arrow image 1205 (+y-axis direction in the drawing) to increase the distance between the top of the convex portion and the bottom of the concave portion in the uneven shape data (that is, in the direction perpendicular to the two-dimensional plane formed by the x axis and the y axis). Meanwhile, the user moves the mouse downward (−y-axis direction in the drawing) along an arrow image 1206 to decrease the distance between the top of the convex portion and the bottom of the concave portion in the uneven shape data. As described above, the uneven shape is enlarged and reduced with respect to the direction perpendicular to the two-dimensional plane formed by the x axis and the y axis by changing the pixel value in the normal vector map indicating the normal vector N of each of the pixels on the surface material (the pixel value oriented in a z direction in a three-dimensional space).

The operation unit 12 enlarges or reduces the uneven shape with respect to the direction perpendicular to the two-dimensional plane formed by the x axis and the y axis, and then reflects the normal vector $N_d$ by creating a height image from the normal vector map, changing the height in the height image according to the scaling factor, and creating a normal vector map from the height image, and writing and storing the normal vector map in the result data table in the storage unit 19.

For example, the height image can be created from the normal vector map by the method described in the reference literature (The Variational Approach to Shape from Shading, Berthold K. P. Horn, and Michael J. Brooks, Computer Vision, Pictures, and Image Processing 1986, Vol. 33 No. 2).

Figure 15A:
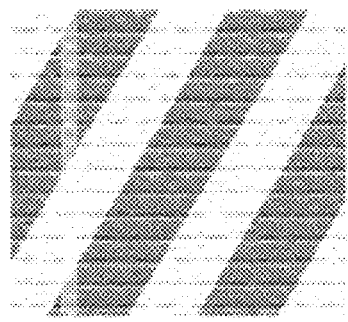
FIG. 15A is a diagram describing the case in which changes in the picture image data, the gloss image data, and the uneven shape data are reflected in all surface materials.
Figure 15B:
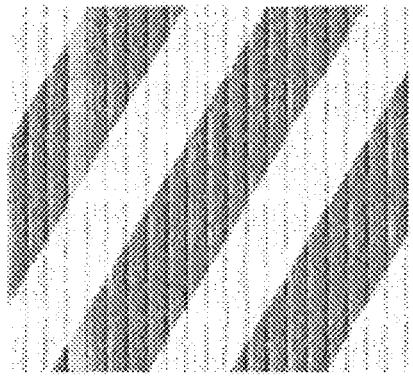
FIG. 15B is a diagram describing the case in which changes in the picture image data, the gloss image data, and the uneven shape data are reflected in all surface materials.

FIGS. 15A and 15B are diagrams illustrating the cases in which the changes in the picture image data, the gloss image data, and the uneven shape data are reflected in all surface materials. FIG. 15A illustrates the case in which the pitch of the uneven shape in the uneven shape data is increased as compared to that illustrated in FIG. 8. FIG. 15B illustrates the case in which the uneven shape data is rotated 90° with respect to that illustrated in FIG. 8. The display unit 18 provides a check box on the display screen to switch the target of reflection of the change between the result images of all the surface materials simulated for the finish of the pattern and the result images of one or more of the surface materials. Accordingly, the operation unit 12 newly creates records necessary for a simulation in the result data table as described above. Then, a new simulation is carried out in correspondence with the records in the result data table as described above. In this way, repeating the correction of the uneven shape in an interactive manner makes if possible to provide the desired finish of the pattern on the surface material in an easy and quick manner.

A pattern on the surface material with an uneven shape may be simulated by recording a program for implementing the functionality of the surface material pattern finish simulation device 1 illustrated in FIG. 1 according to one embodiment of the present invention on a computer-readable recording medium (readable medium), and reading the program from the recording medium into a computer system and executing the same there. The "computer system" here includes an OS and hardware such as peripheral devices.

The "computer system" also includes a WWW system in an environment for providing (displaying) websites. The "computer-readable recording medium" refers to a mobile medium such as a flexible disc, a magneto-optical disc, a ROM or a CD-ROM, or a storage device such as a hard disc built in the computer system. The "computer-readable recording medium" also includes an object holding the program for a certain period of time, such as a volatile memory (RAM) in the computer system as a server or a client in the case where the program is transmitted via a network such as the internet or a communication line such as a telephone line.

The foregoing program may be transmitted from a computer system storing the program in a storage device or the like to another computer system via a transmission medium or a transmission wave in the transmission medium. The "transmission medium" transmitting the program refers to a medium having the function of transmitting information, like a network (communication network) such as the internet or a communication line (communication wire) such as a telephone line. The program may be designed to implement some of the functions described above. Further, the program may be a differential file (differential program) that can implement the functions described above in combination with another program already recorded in the computer system.

The device disclosed in PTL 1 makes it possible to check a finish of an uneven shape but does not allow simulations of picture patterns, inclusive of colors. Accordingly, the device disclosed in PTL 1 does not allow simulations for checking a finish of a pattern formed from pictures and an embossed uneven shape.

Under such circumferences, the present invention has an aspect to provide a surface material pattern finish simulation device and a surface material pattern finish simulation method by which to simulate a finish of a pattern formed from pictures inclusive of colors and an uneven shape on the surface of a surface material and check the finish of the pattern.

A surface material pattern finish simulation device according to a first aspect of the present invention is a surface material pattern finish simulation device that outputs an image of a finish of a pattern formed from a picture and an uneven shape on a surface of a surface material. The surface material pattern finish simulation device includes: an incident light calculation unit that calculates incident light information as information about incident light on each of pixels in the image of the finish of the pattern, from information including a normal vector map and light source information about a light source emitting light to be applied to the surface: a reflected light calculation unit that calculates the radiance of reflected light from the surface for each of the pixels in the image of the finish of the pattern, from calculation information including the incident light information, the normal vector map, diffuse reflectance information in the picture, gloss information indicating the gloss of the surface of the surface material, and observation condition information about the surface material; and a display unit that displays the image of the finish of the pattern on the surface of the surface material determined from the radiance of each of the pixels.

In the surface material pattern finish simulation device according to the first aspect of the present invention, the incident light calculation unit and the reflected light calculation unit may simulate the finish of the pattern in two images different in one or more of uneven shape information, the light source information, the diffuse reflectance information, the gloss information, and the observation information, and the display unit may display the two images on a display screen of the display unit.

The surface material pattern finish simulation device according to the first aspect of the present invention may further include a change unit that changes the normal vector map, the diffuse reflectance information, and the gloss information on the surface of the surface material, according to user input.

The surface material pattern finish simulation device according to the first aspect of the present invention may further include a change unit that applies changes according to user input at a time to the calculation information for simulating the finish and all calculation information different in any of the uneven shape information, the light source information, the diffuse reflectance information, the gloss information, and the observation information in the calculation information.

The surface material pattern finish simulation device according to the first aspect of the present invention may further include an operation unit that inputs in input images for inputting respective data of the uneven shape information, the diffuse reflectance information, and the gloss information on the display screen of the display unit, numerical values corresponding to the amounts of operations performed on the input images as the respective data of the uneven shape information, the diffuse reflectance information, and the gloss information.

In the surface material pattern finish simulation device according to the first aspect of the present invention, the operation unit may input size information indicating the ratio of enlargement or reduction of the finish of the pattern on the display screen of the display unit, and when the size information is input into the operation unit, the operation unit may change the size of an image of the surface material corresponding to the ratio in the size information, and the reflected light calculation unit may determine the radiance of the reflected light from each of the pixels in the image of the surface material which has been changed in the size.

The surface material pattern finish simulation device according to the first aspect of the present invention may further include a normal vector map generation unit that determines a normal vector indicative of the uneven shape on the surface of the surface material for each of the pixels in the image of the surface material and generates the normal vector map.

A surface material pattern finish simulation method according to a second aspect of the present invention is a surface material pattern finish simulation method for outputting an image of a finish of a pattern formed from a picture and an uneven shape on a surface of a surface material with the picture and the uneven shape. An incident light calculation unit calculates incident light information as information about incident light on each of pixels in the image of the finish of the pattern, from information including a normal vector map and light source information about a light source emitting light to be applied to the surface (incident light calculation step). A reflected light calculation unit calculates the radiance of reflected light from the surface for each of the pixels in the image of the finish of the pattern, from calculation information including the incident light information, the normal vector map, diffuse reflectance information in the picture, gloss information indicating the gloss of the surface of the surface material, and observation condition information about the surface material (reflected light calculation step). A display unit displays the image of the finish of the pattern on the surface of the surface material determined from the radiance of each of the pixels (display step).

As described above, according to the aspects of the present invention, it is possible to provide a surface material pattern finish simulation device and a surface material patient finish simulation method by which to simulate a finish of a pattern formed from pictures inclusive of colors and an uneven shape on the surface of a surface material and check the finish of the pattern on the surface material in a quick and easy manner without creating a sample.

REFERENCE SIGNS LIST

1 . . . Surface material pattern finish simulation device
11 . . . Input unit
12 . . . Operation unit
13 . . . Normal vector map generation unit
14 . . . Incident light calculation unit
15 . . . Reflected light calculation unit
16 . . . Pixel value calculation unit
17 . . . Edit unit
18 . . . Display unit
19 . . . Storage unit
20 . . . Surface material database Obviously, numerous modifications and variations of the present invention are possible in light of the above teachings. It is therefore to be understood that within the scope of the appended claims, the invention may be practiced otherwise than as specifically described herein.

What is claimed is:

1. A device for generating a simulation image, comprising:

circuitry configured to obtain information including a normal vector map and light source information about a source of light to be applied to a surface of a material,
calculate incident light information, which is information about incident light on each of pixels in an image to be generated as simulation of a finish of a pattern including a picture and an uneven shape on the surface, based on the information including the normal vector map and the light source information about the source of light to be applied to the surface;
calculate a radiance of reflected light from the surface with respect to for each of the pixels in the image, based on calculation information including the incident light information, the normal vector map, diffuse reflectance information about the picture, gloss information indicating gloss of the surface, and observation condition information about the material, and
control display of the image based on the radiance of each of the pixels.

2. The device of claim 1, wherein the circuitry is configured to control generation of two images, as simulation of the finish of the pattern, which are different in at least one of uneven shape information, the light source information, the diffuse reflectance information, the gloss information, and the observation information, and to control display of the two images on a display screen.

3. The device of claim 1, wherein the circuitry is configured to control changing the normal vector map, the diffuse reflectance information, and the gloss information on the surface, according to a user input.

4. The device of claim 3, wherein the circuitry is configured to control application of changes such that the changes according to a user input are simultaneously applied to the calculation information for simulating the finish and to all of calculation information different in any of the uneven shape information, the light source information, the diffuse reflectance information, the gloss information, and the observation information in the calculation information.

5. The device of claim 3, wherein the circuitry is configured to control an input operation such that, with respect to input images for inputting respective data of the uneven shape information, the diffuse reflectance information, and the gloss information on the display screen, numerical values corresponding to amounts of operations performed on the input images are input as the respective data of the uneven shape information, the diffuse reflectance information, and the gloss information.

6. The device of claim 5, wherein the circuitry is configured to control input of size information indicating a ratio of enlargement or reduction of the finish of the pattern on the display screen, to change a size of an image of the material in accordance with the ratio in the size information when the size information is input, and to determine the radiance of the reflected light from each of the pixels in the image of the material which has been changed in the size.

7. The device of claim 1, wherein the circuitry is configured to control determination of a normal vector indicative of the uneven shape on the surface for each of the pixels in the image of the material and to generate the normal vector map.

8. A method of generating an image simulating a finish of a pattern including a picture and an uneven shape on a surface of a material, comprising:

calculating incident light information which is information about incident light on each of pixels in the image of the finish of the pattern, based on information including a normal vector map and light source information about a source of light to be applied to the surface;

calculating a radiance of reflected light from the surface for each of the pixels in the image of the finish of the pattern, based on calculation information including the incident light information, the normal vector map, diffuse reflectance information in the picture, gloss information indicating the gloss of the surface of the material, and observation condition information about the material; and displaying the image of the finish of the pattern on the surface of the material obtained from the radiance of each of the pixels.

9. The method of claim 8, wherein two images are generated, as simulation of the finish of the pattern, which are different in at least one of uneven shape information, the light source information, the diffuse reflectance information, the gloss information, and the observation information, and the two images are displayed on a display screen.

10. The method of claim 8, wherein the normal vector map, the diffuse reflectance information, and the gloss information on the surface are changed according to a user input.

11. The method of claim 10, wherein changes according to a user input are simultaneously applied to the calculation information for simulating the finish and to all of calculation information different in any of the uneven shape information, the light source information, the diffuse reflectance information, the gloss information, and the observation information in the calculation information.

12. The method of claim 8, wherein with respect to input images for inputting respective data of the uneven shape information, the diffuse reflectance information, and the gloss information on the display screen, numerical values corresponding to amounts of operations performed on the input images are input as the respective data of the uneven shape information, the diffuse reflectance information, and the gloss information.

13. The method of claim 8, wherein when the size information indicating a ratio of enlargement or reduction of the finish of the pattern on the display screen is input, a size of an image of the material is changed in accordance with the ratio in the size information, and the radiance of the reflected light from each of the pixels in the image of the material which has been changed in the size is determined.

14. The method of claim 8, wherein a normal vector indicative of the uneven shape on the surface is determined for each of the pixels in the image of the material, and the normal vector map is generated.

* * * * *